(12) United States Patent
Wang

(10) Patent No.: US 10,602,580 B2
(45) Date of Patent: Mar. 24, 2020

(54) CONSTANT VOLTAGE DIMMING POWER SUPPLY AND DIMMING SYSTEM FOR LIGHTING DEVICE

(71) Applicants: Self Electronics Co., Ltd., Ningbo, Zhejiang (CN); Wanjiong Lin, Zhejiang (CN); Self electronics USA Corporation, Norcross, GA (US)

(72) Inventor: Qiming Wang, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/425,394

(22) Filed: May 29, 2019

(65) Prior Publication Data

US 2019/0373695 A1 Dec. 5, 2019

(30) Foreign Application Priority Data

May 31, 2018 (CN) .......................... 2018 1 0554316

(51) Int. Cl.
*H05B 37/00* (2006.01)
*H05B 33/08* (2020.01)
*F21V 23/02* (2006.01)

(52) U.S. Cl.
CPC ....... *H05B 33/0845* (2013.01); *F21V 23/023* (2013.01); *H05B 33/0818* (2013.01)

(58) Field of Classification Search
CPC .... H05B 41/34; H05B 33/0803; H05B 39/09; H05B 41/28; H05B 33/0809; H05B 33/0815; H05B 33/0818; H05B 41/2828; H05B 41/3921; H05B 41/3927; H05B 37/029; H05B 37/0254; H05B 37/02

See application file for complete search history.

(56) References Cited

U.S. PATENT DOCUMENTS

| | | | |
|---|---|---|---|
| 2013/0051090 A1* | 2/2013 | Xie | H02M 1/4258 363/21.17 |
| 2014/0354170 A1* | 12/2014 | Gredler | H05B 33/0815 315/224 |
| 2017/0311396 A1* | 10/2017 | Sadwick | F21V 25/00 |

* cited by examiner

*Primary Examiner* — Minh D A
(74) *Attorney, Agent, or Firm* — Wang Law Firm, Inc.

(57) ABSTRACT

The invention relates to a constant voltage dimming power supply for lighting device, which is used for adjusting output voltage regulated by dimmer to realize constant voltage PWM output, including a rectifying circuit performing rectifier filtering to output voltage regulated by dimmer; a constant voltage circuit electrically connected to output end of the rectifying circuit; a constant current load circuit electrically connected to output end of the rectifying circuit; a frequency conversion and protection sampling circuit electrically connected to output end of the constant current load circuit and constant voltage; and a switching circuit for controlling lighting load illumination; the frequency conversion and protection sampling circuit converts an output signal of the constant current load circuit into a duty cycle signal suitable for controlling the switching circuit and detects the output abnormality of the constant voltage circuit in real time, and the switching circuit is controlled to be turned on and off accordingly. Compared with the prior art, the constant voltage dimming power supply provided by the invention can provide a stable current and voltage and can well protect the lighting load.

12 Claims, 1 Drawing Sheet

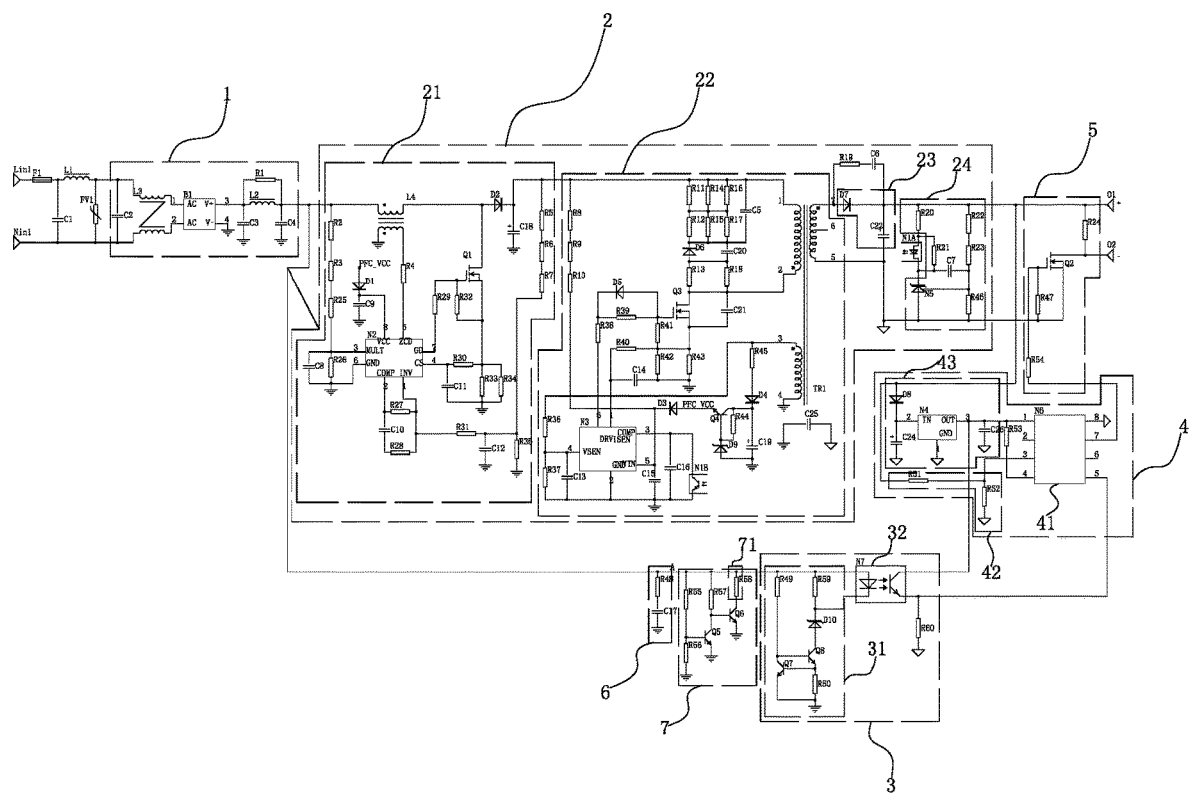

CONSTANT VOLTAGE DIMMING POWER SUPPLY AND DIMMING SYSTEM FOR LIGHTING DEVICE

RELATED APPLICATION

This application claims priority to a Chinese Patent Application No. CN 201810554316.3, filed on May 31, 2018.

FIELD OF THE TECHNOLOGY

The present invention relates to electronic equipment field, with particular emphasis on a constant voltage dimming power supply and dimming system for lighting device.

BACKGROUND OF THE INVENTION

With the widespread use of lighting equipment, lighting power has also been greatly developed, such as LED power can change the output power in response to the dimmer, thereby changing the brightness of the LED lamps.

Since LED lamps usually contain an array of LEDs, in order to ensure high matching between the LEDs and the consistency of the dimming effect, the LED lamps must be driven by constant current sources, and the current must be strictly controlled.

However, the output of the dimmer is often an angle-missing phase-shifted sinusoidal wave containing high-order harmonics when the dimmer is performing phase-cut dimming. The effective value of the output voltage has a nonlinear relationship with the conduction angle, which usually causes the circuit current unstable, causing the lamp to flicker, uneven illumination or burned damage, etc. The existing power supply has no good corresponding treatment measures; at the same time, when the dimmer performs phase-cut dimming, it is easy to cause a sudden voltage change, further causing circuit instability. After the rectification and filtering of the mains, the capacitor will store a certain amount of electricity, resulting in that the bus voltage does not fall to the zero level, and then the judgment of the high voltage phase angle of the input alternating current is affected. As a result, the voltage amplitude range of the output to the lamp is small, and the lamp cannot conduct depth dimming in a wide range.

BRIEF SUMMARY OF THE INVENTION

In view of the above problems, an object of the present invention is to provide a constant voltage dimming power supply for lighting device capable of outputting constant voltage PWM signal and monitoring circuit abnormalities to protect lighting load.

It is also an object of the present invention to provide a constant voltage dimming power supply for lighting device that is capable of absorbing and filtering the power supply input to provide stable voltage while having a good match with different dimmers.

The object of the present invention is to provide a constant voltage dimming power supply capable of venting residual voltage in a circuit, ensuring high-voltage phase angle judgment accuracy in the circuit, widening the adjustable voltage range of the lighting device and adjusting the brightness of the lighting device.

It is also an object of the present invention to provide a corresponding dimming system.

In order to achieve the above object, the technical solution adopted by the present invention is: a constant voltage dimming power supply for lighting device, being configured to adjust the output voltage after being regulated by a dimmer to realize constant voltage PWM output, includes:

a rectifying circuit, configured to rectify and filter an output voltage regulated by dimmer;

a constant voltage circuit, configured to be electrically connected to an output end of the rectifying circuit;

characterized in that:

a constant current load circuit, electrically connected to an output end of the rectifying circuit;

a frequency conversion and protection sampling circuit, configured to be electrically connected to the output end of the constant current load circuit and the output end of the constant voltage circuit; and a switching circuit for controlling illumination of lighting load;

wherein the frequency conversion and protection sampling circuit converts the output signal of the constant current load circuit into a duty cycle signal suitable for controlling the switching circuit, and detects the output abnormality of the constant voltage circuit in real time, so as to control the on-off of the switching circuit.

Since the peak voltage will be generated when the mains power is regulated by the dimmer, the peak voltage will easily lead to the output instability of the back-end circuit, resulting in poor consistency of the output of the lighting load. In order to eliminate this effect, advantageously, the constant voltage dimming power supply further includes an absorbing circuit for filtering between the rectifying circuit and the constant current load circuit. It is used to eliminate high harmonics, absorb peak voltage, provide stable voltage and current, and improve the matching degree between the circuit and different dimmers.

Because there are multiple capacitors in the circuit, and the capacitor absorb and store energy, when the input alternating current is zero, the voltage of busbar A does not drop to zero level, which will affect the judgment of the high voltage phase angle of the input alternating current, causing the phase angle of the input high voltage to be out of proportion with the brightness of the output light, which causes the adjustable range of the load brightness to be greatly reduced. To solve this problem, advantageously, the constant voltage dimming power supply further includes a low voltage discharge circuit electrically connected between the absorbing circuit and the constant current load circuit; the low voltage discharge circuit conducts when the input voltage is a low voltage and releases part of energy through the built-in load.

Advantageously, the constant current load circuit includes constant current circuit electrically connected to an output end of the rectifying circuit, and constant current load composed of optocoupler isolation device;

the constant current load outputs an output signal that is proportional to the phase-cut angle of the output voltage regulated by the dimmer. The constant current load formed by the optocoupler isolator can isolate and convert the output of constant current circuit on the high voltage side into electrical signals suitable for frequency conversion and protection sampling circuit to meet the requirements of electrical isolation.

Advantageously, the frequency conversion and protection sampling circuit includes frequency conversion circuit that receives pulse signals output from the constant current load circuit and provides frequency conversion to output the same duty cycle signal, and short circuit protection sampling circuit being configured to collect signals output from the constant voltage circuit and transmit them to the frequency conversion circuit.

Advantageously, the short circuit protection sampling circuit includes at least two voltage sampling resistors connected in series, and the frequency conversion circuit is composed of microprocessor;

the microprocessor judges whether the constant voltage circuit is abnormal or not and controls the switching circuit to be turned on and off according to the obtained partial voltage signal of at least one of the resistors.

Advantageously, the frequency conversion and protection sampling circuit further includes a voltage stabilizing source formed by voltage stabilizing block for use in the frequency conversion circuit.

Advantageously, the constant current circuit includes first constant current switching tube, second constant current switching tube electrically connected to each other to control the magnitude of the output current and voltage regulator tube electrically connected with first constant current switching tube to control the constant current load on and off;

when the first constant current switching tube is on and the current flowing therethrough is sufficient to cause the second constant current switching tube to be turned on, the second constant current switching tube is on to inhibit the first constant current switching tube to be on, and the output current is controlled to be constant by mutual inhibition of the two;

the voltage regulator tube controls the conduction and the off of the constant current load when the output value is lower than the stable value.

Advantageously, the first constant current switching tube and the second constant current switching tube are NPN type triodes;

wherein the base of the first constant current switching tube is electrically connected to the first current limiting resistor and the collector of the second constant current switching tube, the collector of the first constant current switching tube is connected to the positive pole of the voltage regulator tube, the base of the second constant current switching tube is electrically connected to the emitter of the first constant current switching tube and grounded through the second current limiting resistor, the emitter of the first constant current switching tube is grounded, and the negative pole of the voltage regulator tube is electrically connected to the optocoupler isolation device.

Advantageously, the low voltage discharge circuit includes electrically connected fourth switching tube, fifth switching tube, and load circuit in cooperation with the fourth switching tube for releasing the residual voltage of the circuit;

the fourth switching tube is inhibited from being turned on by the fifth switching tube when the rectifying circuit outputs a high voltage, and is turned on when the rectifying circuit outputs a low voltage, and the load circuit electrically connected thereto is energized to consume the residual voltage of the circuit.

Advantageously, the fourth switching tube and the fifth switching tube are NPN type triodes, and the load circuit is composed of load resistor;

the collector of the fourth switching tube is connected to the output end of the rectifying circuit through a load resistor, and the base is connected to the collector of the fifth switching tube and then connect to the output end of the rectifying circuit through a third current limiting resistor, the base of the fifth switching tube is connected with a pull-up resistor and a pull-down resistor;

the fifth switching tube is controlled to be on when the rectifying circuit outputs high voltage and off when it outputs low voltage by the resistance value ratio between the pull-up resistor and the pull-down resistor.

Advantageously, the absorbing circuit is composed of fifth resistor and capacitor.

Advantageously, the constant voltage circuit includes a power factor correction circuit at the rear end of the rectifying circuit, a flyback circuit electrically connected to the power factor correction circuit and carrying out energy conversion through the transformer, a second rectifying circuit for rectifying and filtering the output of the flyback circuit and a current limiting circuit.

A constant voltage dimming system for lighting device, includes a dimmer for outputting a voltage phase-cut signal, the constant voltage dimming system employing the same as described above constant voltage dimming power supply.

Compared with the prior art, the invention has the advantages that the constant current load circuit which is located at the rear end of the flyback circuit is advanced to the rear end of the rectifying circuit, and the frequency conversion and protection sampling circuit is arranged at the rear end of the constant current load circuit, and the frequency conversion function can ensure that the duty cycle of the pulse signal output to the load is consistent with the constant current load circuit, provide consistency for the load output, protect the sampling circuit to detect whether there is an abnormality in the front end circuit in real time, and shut down the load in time when there is an abnormality, so as to protect the load from being affected.

BRIEF DESCRIPTION OF THE DRAWINGS

The drawings described herein are intended to promote a further understanding of the present invention, as follows:

FIG. 1 is a circuit diagram of an embodiment of a constant voltage dimming power supply of the present invention.

DETAILED DESCRIPTION OF THE INVENTION

Embodiments of the invention are described in detail below, Examples of the embodiments are shown in the appended drawings in which consistently identical or similar labels represent identical or similar elements or elements having the same or similar function. The embodiments described below by reference to the drawings are exemplary and are only used for the interpretation of the invention and cannot be understood to be a limitation of the invention.

FIG. 1 shows an exemplary circuit diagram of the constant voltage dimming power supply of the present invention, but it should be noted that the present application is not only applicable to the circuit structure, but also other structures capable of realizing the functions of the present application, which are Included within the scope of the present application. Only a constant voltage dimming power supply and corresponding constant voltage dimming system for lighting device as shown in FIG. 1 are described herein.

As shown in FIG. 1, the constant voltage dimming power supply includes a rectifying circuit 1 configured to rectify and filter an output voltage regulated by a dimmer; and a constant voltage circuit 2 is configured to be electrically connected to an output end of the rectifying circuit 1. In the past, the constant voltage dimming power supply was only used to convert the duty cycle of the output signal at the back end of the constant voltage circuit. This kind of design is often unable to ensure the consistency between the duty ratio of the output and the duty ratio of the input. In addition, when the circuit is short, it cannot be detected immediately, and it is easy to cause damage to the back-end circuit.

In order to avoid the above problem, in the embodiment, the constant voltage dimming power supply includes a constant current load circuit 3 electrically connected to the output end of the rectifying circuit 1, and a frequency conversion and protection sampling circuit 4 being configured to be electrically connected to the output end of the constant current load circuit 3 and the output end of the constant voltage circuit 2, and a switching circuit 5 for controlling illumination of lighting load, wherein the frequency conversion and protection sampling circuit 4 can convert the output signal of constant current load circuit 3 into duty cycle signal suitable for control switching circuit 5 and detect the load abnormality in real time. When the load is short-circuited, the frequency conversion and protection sampling circuit 4 controls the switching circuit 5 to be turned off, and the lighting load is powered off, so that the load short circuit can be prevented in time from causing the line to be burnt.

Specifically, the frequency conversion and protection sampling circuit 4 includes a frequency conversion circuit 41 that receives pulse signals output from the constant current load circuit 3 and provides frequency conversion to output the same duty ratio signal, and an short circuit protection sampling circuit 42 being configured to collect signals output from the constant voltage circuit 2 and transmit them to the frequency conversion circuit. As shown in FIG. 1, the frequency conversion circuit 41 is a microprocessor N6, and the short circuit protection sampling circuit 42 includes at least two voltage sampling resistors R51 and R52 connected in series, and the sampling voltage of the voltage dividing resistor R52 is transmitted to the microprocessor N6, the other end of the sampling resistor R51 is connected to the output end of the constant voltage circuit. For example, when the load is short-circuited, the voltage on the resistor R52 drops. Once the microprocessor N6 detects the information above, it judges the load over current or short circuit fault, and then controls the switching circuit connected to it to turn off, thereby preventing the line from being damaged.

In order to ensure that the microprocessor has a stable operating voltage, the frequency conversion and protection sampling circuit 4 further includes a voltage stabilizing source 43 formed by voltage stabilizing block. Referring to FIG. 1, the voltage stabilizing source 43 is composed of diode D8, capacitor C24, voltage stabilizing block N4 and capacitor C26, and the positive pole of the diode D8 is connected to the output end of the constant voltage circuit, and is connected to the microprocessor N6 through the voltage regulator block N4 for use by the microprocessor.

In order to control the circuit to maintain a relatively stable voltage, the input end of the constant voltage dimming power supply will be connected to the dimmer, and the constant voltage output can be better realized by adjusting the output voltage regulated by the dimmer. It is easily conceivable that the dimmer can be either a front phase cut dimmer or a rear phase cut dimmer, in this embodiment a bidirectional thyristor dimmer is used. No matter which type of dimmer is used, the dimmer will generate high voltage shock when switching in each AC cycle, forming a spike voltage, and the spike voltage will easily lead to unstable output of the back end circuit, resulting in poor consistency of output of the lighting load.

In order to eliminate this effect, as a modification, the constant voltage dimming power supply includes an absorbing circuit 6 between the rectifying circuit 1 and the constant current load circuit 3. Specifically, in the embodiment, the absorbing circuit 6 is composed of fifth resistor R48 and capacitor C17. The RC circuit can be used to absorb higher harmonics, absorb the spike voltage, and reduce the influence of the voltage output from the rectifying circuit on the latter stage. Based on this principle, the RC circuit can perform filtering effect no matter what kind of dimmer is adopted, and then the matching degree between constant voltage dimming power supply circuit and different dimmers can be improved.

Because there are multiple capacitors in the circuit, and the capacitor absorb and store energy, when the input alternating current is zero or the zero voltage is input when the dimmer is dimmed, the voltage of busbar A does not drop to zero level, which will affect the judgment of the high voltage phase angle of the input alternating current, causing the minimum voltage range really used for lighting load is much higher than 0V, making the adjustable range of load brightness greatly reduced. To solve this problem, the present application also designs a low voltage discharge circuit 7 electrically connected between the absorbing circuit 6 and the constant current load circuit 3 in the constant voltage dimming power supply, and the circuit conducts when the input voltage is low and releases some energy through the built-in load.

Referring to FIG. 1, in the embodiment, the low voltage discharge circuit 7 is composed of fourth switching tube Q6, fifth switching tube Q5, load circuit 71 matched with fourth switching tube Q6 for releasing the residual voltage of the circuit and resistors R55, R56 and third current limiting resistor R57 electrically connected with each other. Of course, the load circuit 71 can be composed of a plurality of resistors. In the embodiment, the load circuit 71 is composed of load resistor R58. Meanwhile, in the embodiment, the fourth switching tube Q6 and the switching tube Q5 are NPN type triode. Of course, it should be mentioned that the fourth switching tube and the fifth switching tube are not only triodes, but also other electronic devices having a switching function such as a MOS tube.

The collector of the fourth switching tube Q6 is connected to the output end of the rectifying circuit 1 through the load resistor R58. The base of the fourth switching tube Q6 is connected to the collector of the fifth switching tube Q5 and then connected to the output end of the rectifying circuit 1 through the third current limiting resistor R57. The resistor R55 and the resistor R56 are respectively connected as the pull-up resistor and the pull-down resistor to the base of the fifth switching tube Q5. It can be controlled that the fifth switching tube Q5 conducts when the rectifying circuit outputs high voltage and shuts off when it outputs low voltage through the ratio of the resistance value between the pull-up resistor and the pull-down resistor, while the fourth switching tube Q6 conducts in the opposite way to Q5. Specifically, when the busbar A behind the rectifier bridge is of high voltage, it will be attenuated by R55 and R56 and then turn on Q5. Since the base of Q6 is of low voltage and the cut-off of Q6, the load resistance R58 has no current, when the busbar A behind the rectifier bridge is low voltage, it is mainly residual voltage. After attenuation by R55 and R56, it is not enough to open Q5, the base of Q6 is of high voltage, Q6 conducts, and the load resistance R58 is energized to consume residual voltage.

With continued reference to FIG. 1, the constant current load circuit 3 includes constant current circuit 31 electrically connected to the output end of the rectifying circuit 1, and constant current load 32 composed of optocoupler isolation device, the constant current load 32 outputs an output signal proportional to the phase-cut angle of output voltage regulated by the dimmer.

The constant current circuit 31 includes first constant current switching tube, second constant current switching tube electrically connected to each other for controlling the magnitude of the output current and a voltage regulator tube electrically connected with the first constant current switching tube to control the constant current load 32 on and off. When the first constant current switching tube is on and the current flowing therethrough is sufficient to cause the second constant current switching tube to be on, the second constant current switching tube is on, thereby inhibiting the first constant current switching tube to be on, and controlling the output current to be constant through the mutual inhibition of the two. At the same time, the function of the voltage regulator tube is to turn off the optocoupler conduction when the input voltage is lower than the voltage regulator value, that is, to control the conduction and the off of the constant current load 32.

Specifically, in this embodiment, as shown in FIG. 1, the first constant current switching tube and the second constant current switching tube are respectively a triode tube Q8 and a triode tube Q7, and the voltage regulator tube is a voltage regulator tube D10, the base of the Q8 is electrically connected to the first current limiting resistors R49 and the collector of Q7, the collector of Q8 is connected to the positive pole of D10, the base of Q7 is electrically connected to the emitter of Q8 and grounded through the second current limiting resistor R50, the emitter of Q8 is grounded, and the negative pole of D10 is electrically connected to the optocoupler isolator N7. When busbar A is high voltage, Q8 is conducted with R49 current limiting. When collector current $I_e$ of Q8 is greater than 0.7V/R50, Q7 conducts, which further restricts Q8 to continue conducting, and then makes $I_e$ fall below 0.7 v/R50. Q7 is cut off again, and Q8 conducts again. Therefore, the interaction between Q7 and Q8 can make the Ice of Q8 about 0.7 v/R50A, thus forming a constant current.

At the same time, the constant current load 32 formed by the optocoupler isolator can isolate and convert the output of constant current circuit 31 on the high voltage side into electrical signals suitable for frequency conversion and protection sampling circuit 5 to meet the requirements of electrical isolation. When the voltage of the busbar is less than the regulation value of D10, the optocoupler does not conduct. When the voltage of the busbar A is greater than the regulation value of D10, the optocoupler conducts, and the conduction current is controlled by the constant current circuit 31 in the front end, and further It can be controlled at about 1 mA. The output of the optocoupler outputs a square wave signal with the same phase as the input. The duty cycle of the square wave is controlled by the state of the input dimmer.

N6 can carry out frequency conversion of PWM signal output from optocoupler, so that the duty cycle of the output PWM is basically the same as that of the input PWM. Meanwhile, the higher the frequency after conversion, the less harm the ripple current of the lighting load will do to people.

With continued reference to FIG. 1, the constant voltage circuit 2 includes a power factor correction circuit 21 at the rear end of the rectifying circuit 1, a flyback circuit 22 electrically connected to the power factor correction circuit 21 and carrying out energy conversion through the transformer TRIAC, a second rectifying circuit 23 for rectifying and filtering the output of the flyback circuit 22, and a current limiting circuit 24, and these are all prior art and will not be described herein.

At the same time, the present application also relates to a constant voltage dimming system for lighting device, the constant voltage dimming system comprising a dimmer for outputting a voltage phase-cut signal, the constant voltage dimming system employing the same as described above constant voltage dimming power supply.

It should be noted that the switching tube and the switching device in this embodiment are only one enumeration or only one corresponding device operation in the specific embodiment, but this does not mean that only the device described in this embodiment can be used. Other devices having a switching function that can achieve the technical effects of the present application are within the scope of protection of the present application, such as MOS tubes, IGBT tubes, and the like.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. A constant voltage dimming power supply for lighting device, being configured to adjust the output voltage after being regulated by a dimmer to realize constant voltage PWM output, includes:
   a rectifying circuit, configured to rectify and filter an output voltage regulated by dimmer;
   a constant voltage circuit, configured to be electrically connected to an output end of the rectifying circuit;
   characterized in that:
   a constant current load circuit, electrically connected to an output end of the rectifying circuit;
   a frequency conversion and protection sampling circuit, configured to be electrically connected to the output end of the constant current load circuit and the output end of the constant voltage circuit;
   and a switching circuit for controlling illumination of lighting load;
   wherein the frequency conversion and protection sampling circuit includes a frequency conversion circuit that receives pulse signals output from the constant current load circuit, converts the output signal of the constant current load circuit into a duty cycle signal suitable for controlling the switching circuit, provides frequency conversion to output the same duty cycle signal, and detects the output abnormality of the constant voltage circuit in real time, so as to control the on-off of the switching circuit; and
   a short circuit protection sampling circuit being configured to collect signals output from the constant voltage circuit and transmit them to the frequency conversion circuit.

2. The constant voltage dimming power supply of claim 1, wherein the constant voltage dimming power supply further includes an absorbing circuit for filtering between the rectifying circuit and the constant current load circuit.

3. The constant voltage dimming power supply of claim 2, wherein the constant voltage dimming power supply further includes a low voltage discharge circuit electrically connected between the absorbing circuit and the constant current load circuit;

the low voltage discharge circuit conducts when the input voltage is a low voltage and releases part of energy through the built-in load.

4. The constant voltage dimming power supply of claim 3, wherein the low voltage discharge circuit includes electrically connected fourth switching tube, fifth switching tube, and load circuit in cooperation with the fourth switching tube for releasing the residual voltage of the circuit;

the fourth switching tube is inhibited from being turned on by the fifth switching tube when the rectifying circuit outputs a high voltage, and is turned on when the rectifying circuit outputs a low voltage, and the load circuit electrically connected thereto is energized to consume the residual voltage of the circuit.

5. The constant voltage dimming power supply of claim 4, wherein the fourth switching tube and the fifth switching tube are NPN type triodes, and the load circuit is composed of load resistor;

the collector of the fourth switching tube is connected to the output end of the rectifying circuit through a load resistor, and the base is connected to the collector of the fifth switching tube and then connect to the output end of the rectifying circuit through a third current limiting resistor, the base of the fifth switching tube is connected with a pull-up resistor and a pull-down resistor;

the fifth switching tube is controlled to be on when the rectifying circuit outputs high voltage and off when it outputs low voltage by the resistance value ratio between the pull-up resistor and the pull-down resistor.

6. The constant voltage dimming power supply of claim 2, wherein the absorbing circuit is composed of a fifth resistor and capacitor.

7. The constant voltage dimming power supply of claim 1, wherein the constant current load circuit includes constant current circuit electrically connected to an output end of the rectifying circuit, and constant current load composed of optocoupler isolation device;

the constant current load outputs an output signal that is proportional to the phase-cut angle of the output voltage regulated by the dimmer.

8. The constant voltage dimming power supply of claim 7, wherein the constant current circuit includes first constant current switching tube, second constant current switching tube electrically connected to each other to control the magnitude of the output current and voltage regulator tube electrically connected with first constant current switching tube to control the constant current load on and off;

when the first constant current switching tube is on and the current flowing therethrough is sufficient to cause the second constant current switching tube to be turned on, the second constant current switching tube is on to inhibit the first constant current switching tube to be on, and the output current is controlled to be constant by mutual inhibition of the two;

the voltage regulator tube controls the conduction and the off of the constant current load when the output value is lower than the stable value.

9. The constant voltage dimming power supply of claim 8, wherein the first constant current switching tube and the second constant current switching tube are NPN type triodes;

wherein the base of the first constant current switching tube is electrically connected to the first current limiting resistor and the collector of the second constant current switching tube, the collector of the first constant current switching tube is connected to the positive pole of the voltage regulator tube, the base of the second constant current switching tube is electrically connected to the emitter of the first constant current switching tube and grounded through the second current limiting resistor, the emitter of the first constant current switching tube is grounded, and the negative pole of the voltage regulator tube is electrically connected to the optocoupler isolation device.

10. The constant voltage dimming power supply of claim 1, wherein the short circuit protection sampling circuit includes at least two voltage sampling resistors connected in series, and the frequency conversion circuit is composed of microprocessor;

the microprocessor judges whether the constant voltage circuit is abnormal or not and controls the switching circuit to be turned on and off according to the obtained partial voltage signal of at least one of the resistors.

11. The constant voltage dimming power supply of claim 1, wherein the frequency conversion and protection sampling circuit further includes a voltage stabilizing source formed by voltage stabilizing block for use in the frequency conversion circuit.

12. The constant voltage dimming power supply of claim 1, wherein the constant voltage circuit includes a power factor correction circuit at the rear end of the rectifying circuit, a flyback circuit electrically connected to the power factor correction circuit and carrying out energy conversion through the transformer, a second rectifying circuit for rectifying and filtering the output of the flyback circuit and a current limiting circuit.

* * * * *